US010854014B2

(12) United States Patent
Rao et al.

(10) Patent No.: US 10,854,014 B2
(45) Date of Patent: Dec. 1, 2020

(54) INTELLIGENT OBJECT RECOGNIZER

(71) Applicant: ACCENTURE GLOBAL SOLUTIONS LIMITED, Dublin (IE)

(72) Inventors: Srikanth G. Rao, Bangalore (IN); Tarun Singhal, Bulandshahr (IN); Ranjana Bhalchandra Narawane, Mumbai (IN); Avishek Gulshan, Patna (IN); Dongay Choudary Nuvvula, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 16/028,103

(22) Filed: Jul. 5, 2018

(65) Prior Publication Data
US 2019/0012844 A1 Jan. 10, 2019

(30) Foreign Application Priority Data

Jul. 7, 2017 (IN) .............................. 201711024019

(51) Int. Cl.
*G06T 19/20* (2011.01)
*G06F 3/01* (2006.01)
(Continued)

(52) U.S. Cl.
CPC ............ *G06T 19/20* (2013.01); *G02B 27/017* (2013.01); *G06F 3/011* (2013.01);
(Continued)

(58) Field of Classification Search
CPC ....... G06T 19/20; G02B 27/017; G06F 3/011; H04N 21/4725
(Continued)

(56) References Cited

U.S. PATENT DOCUMENTS 6,753,865 B1 * 6/2004 Conklin ................. H04N 19/80
345/473
10,586,391 B2 3/2020 Khedkar et al.
(Continued)

FOREIGN PATENT DOCUMENTS

| WO | 2012/166577 A1 | 12/2012 |
| WO | 2014071060 | 5/2014 |
| WO | 2016/028813 A1 | 2/2016 |

OTHER PUBLICATIONS

Achanta, et al., "SLIC Superpixels Compared to State-of-the-Art Superpixel Methods", IEEE Transactions on Pattern Analysis and Machine Intelligence, vol. 34, No. 11, Nov. 1, 2012, pp. 2274-2281.
(Continued)

*Primary Examiner* — Jin Ge
(74) *Attorney, Agent, or Firm* — Mannava & Kang, P.C.

(57) ABSTRACT

An intelligent VR (IVR) system receives a VR content item and automatically augments the VR content item with additional or ancillary content. The intelligent VR system initially identifies within the VR content item, valid textual and non-textual objects that have ancillary content associated therewith. The IVR system provides hotspots that signify presence of the ancillary content for the valid objects during a display of the VR content item. The hotspots and the ancillary content are positioned for display corresponding to pixel blocks including the valid objects. The ancillary content is selected for the hotspots based on a spatial and temporal extent of display of the valid objects. The hotspots with respective ancillary content items and the VR content item are streamed to a head mounted display (HMD) for display to a viewer.

19 Claims, 12 Drawing Sheets

(51) Int. Cl.
*G06F 3/0484* (2013.01)
*H04N 21/478* (2011.01)
*H04N 21/858* (2011.01)
*G02B 27/01* (2006.01)
*H04N 21/4725* (2011.01)

(52) U.S. Cl.
CPC ..... *G06F 3/04842* (2013.01); *H04N 21/4725* (2013.01); *H04N 21/47815* (2013.01); *H04N 21/8583* (2013.01)

(58) Field of Classification Search
USPC .......................................................... 345/419
See application file for complete search history.

(56) References Cited

U.S. PATENT DOCUMENTS

| | | | | |
|---|---|---|---|---|
| 2011/0262111 A1* | 10/2011 | Thornberry | ............ | H04N 5/783 386/330 |
| 2011/0275409 A1* | 11/2011 | Lee | ....................... | G06F 1/1643 455/556.1 |
| 2013/0181971 A1* | 7/2013 | Mueller | .............. | G06F 3/04815 345/419 |
| 2013/0294642 A1 | 11/2013 | Wang et al. | | |
| 2014/0232743 A1* | 8/2014 | Na | ....................... | H04N 5/2258 345/629 |
| 2015/0296228 A1* | 10/2015 | Chen | ....................... | G06F 16/78 725/34 |
| 2016/0196603 A1* | 7/2016 | Perez | ................. | G06K 9/00671 345/633 |
| 2016/0300392 A1 | 10/2016 | Jonczyk et al. | | |
| 2017/0053675 A1 | 2/2017 | Dickerson et al. | | |
| 2017/0084084 A1 | 3/2017 | Durham et al. | | |
| 2017/0085964 A1 | 3/2017 | Chen | | |
| 2018/0268516 A1* | 9/2018 | Coban | ................... | G06T 3/0087 |
| 2018/0276826 A1* | 9/2018 | Van Der Auwera | ....................... | G06T 3/0062 |
| 2018/0295400 A1* | 10/2018 | Thomas | ........... | H04N 21/85406 |
| 2019/0172268 A1* | 6/2019 | Zavesky | ................. | G06T 19/20 |

OTHER PUBLICATIONS

Partial European Search Report dated Nov. 8, 2018, 3, 2017, EP Patent Application No. 18181762, European Patent Office, 34 pages.

* cited by examiner

US 10,854,014 B2

INTELLIGENT OBJECT RECOGNIZER

PRIORITY

The present application claims priority under 35 U.S.C. 119(a)-(d) to the Indian Provisional Patent Application Serial No. 201711024019, having a filing date of Jul. 7, 2017, the disclosure of which is hereby incorporated by reference in its entirety.

BACKGROUND

Virtual reality (VR) is generated by computers so that a person may experience via VR devices such as HMDs (Head-Mounted Displays), a 360 degree view of a natural or artificial environment. VR exploits the various aspects of the sense of sight of a human such as the depth perception in addition a person's sense of balance. The various VR devices and related software aim at immersing the person in the VR environment by closely synchronizing the hardware and the software with the person's perception. The development of the HMDs that enable VR experiences for users has led to the creation of immersive VR experiences such as video games, documentaries and the like.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
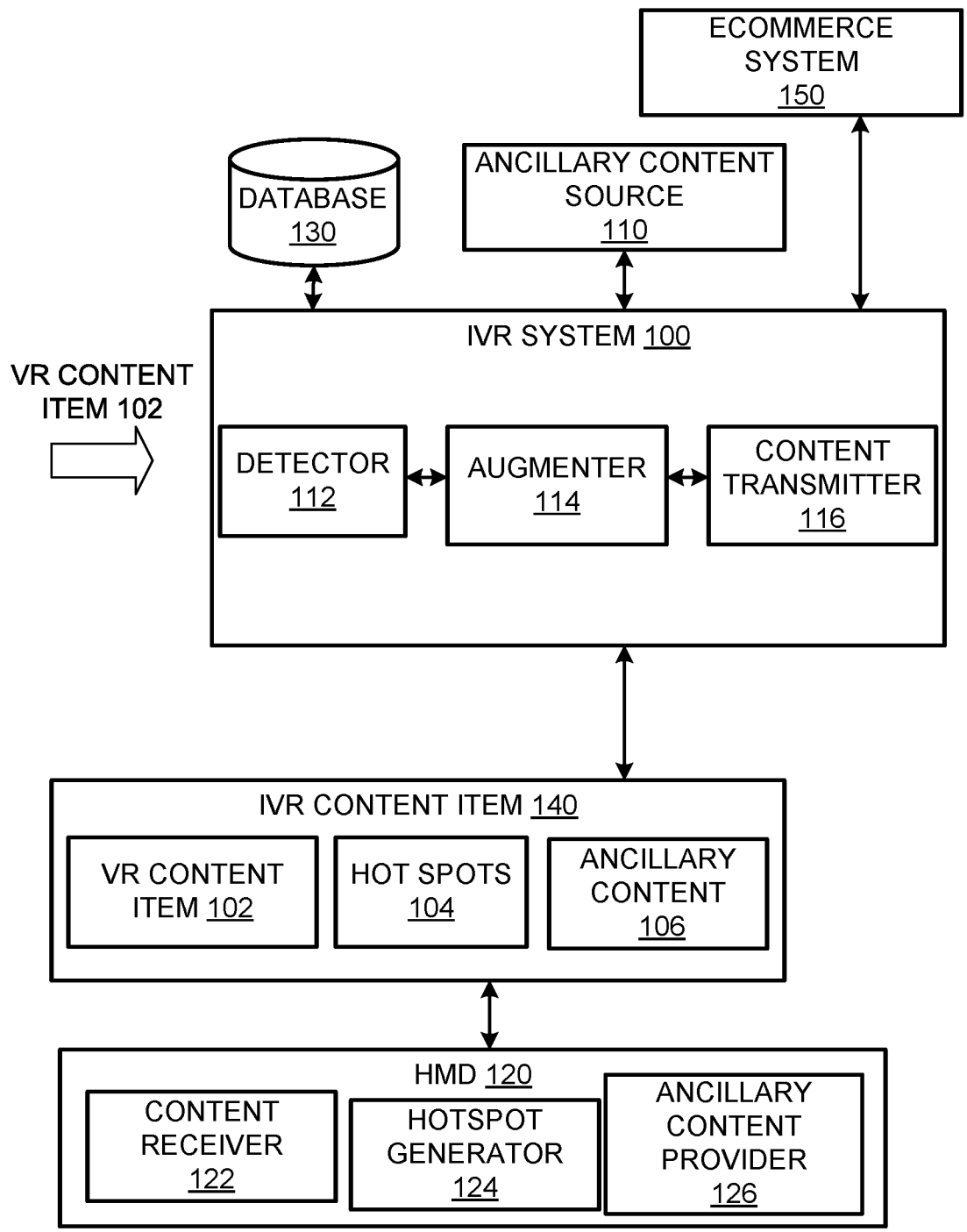
FIG. 1 shows a schematic diagram of an intelligent VR (IVR) system in accordance with one example.

For simplicity and illustrative purposes, the present disclosure is described by referring mainly to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to one or more examples described herein, an intelligent VR (IVR) system is disclosed which receives a VR content item and automatically augments the received VR content item with additional or ancillary content that a viewer can retrieve by interacting with the VR content item. The VR content item is initially analyzed by different procedures to identify valid objects that can receive hotspots. Valid objects can include predefined imagery which encompasses textual and non-textual images which the IVR system is trained to recognize as locations for user interaction which enables displaying ancillary content. Accordingly, particular textual items such as taglines pertaining to product advertisements, brand logos or any particular symbols and non-textual items of interest such as scoreboards, balls, fields, goal posts at sporting events and the like can be treated as valid objects. In addition, the IVR system can also include facial recognition algorithms to identify people of interest such as performers at events or celebrities attending the events and the like.

The VR content item can be initially analyzed via a simple analytical procedure to recognize one or more textual objects that can include textual data. For example, advertisement taglines, slogans on signboards or hoardings, numbers and similar textual data can be identified via the simple analytical procedure. In an example, GOOGLE Vision can be employed to identify textual imagery within the VR content item. A more complex analytical procedure which includes deep pattern matching techniques, facial recognition algorithms and the like can be employed to identify other object imagery. In either case, the VR content item is processed to extract video frames which are then subjected to an iterative dissecting procedure to produce a plurality of pixel blocks which are groups of pixels with preconfigured sizes. Deep pattern matching techniques are then employed to isolate pixel blocks which include the valid objects from the objects recognized.

When the pixel blocks including the valid objects are identified, the coordinates of the pixel blocks within a respective video frame are obtained. Based on the coordinates, the size of the logo as it appears in the VR content item may also be determined. In addition, the time period(s) for which the valid objects appear during the play of the VR content item may also be determined, based, for example on the number of video frames which contain the valid objects. The spatial and temporal attributes of the valid objects within the VR content item thus obtained may be employed in identifying the ancillary content and providing the ancillary content to viewers when the hotspots associated with the valid objects are selected.

Hotspots are points associated with the valid objects within a display of the VR content item where viewers can access the ancillary content. For example, based on the size and time period that a logo is displayed, ancillary content such as a still image including a coupon, a short version of a video ad or a full length version of the video ad may be associated with the hotspot. In some examples, a completely different VR content item which requires the user to exit the VR content item including a selected hotspot and begins another VR content item environment may also be provided. In some examples, ecommerce can be enabled via the ancillary content. By the way of illustration and not limitation, a viewer who is looking at a soda ad hoarding during a sporting event for example, may be provided with an opportunity to have delivered a sandwich and soda within a short time period. This permits the viewer to continue watching the sporting event even as the viewer makes arrangements for a meal.

The VR content item along with the information regarding the position of the hotspots which provide access to the ancillary content is transmitted to a HMD for display to a viewer. The viewer may view the VR content item and the presence of a hotspot may be signaled for example, via an icon. The user can select the icon via gesture or voice commands. Once selected, the hotspot is activated to provide its corresponding ancillary content. It may be noted that positioning hotspots in the HMD may require conversion of the coordinates from a 2D Cartesian coordinate system to a spherical coordinate system which is more suitable to the 3D VR environment.

The increasing popularity of VR content has led to multiple technological developments. However, current VR content is passively presented wherein the viewer merely views the VR content while controlling the virtual motion within the VR environment via head gestures with little choice regarding the viewed content. In order to enhance the VR content with interactivity, appropriate points of interaction (hotspots) need to be identified and the interactive content tailored to the spatial and temporal dimensions of a given hotspot needs to be presented. Moreover, when incorporating the interactivity, accurate placement of the hotspots within the VR content ensures smooth user interaction, thereby encouraging users to increasingly interact with the hotspots. In accurately placing the hotspots within the VR content item, technical issues such as translation from Cartesian coordinates to spherical coordinates to accommodate different displays such as, flat displays which may be employed to edit the VR content and curved displays of the VR content viewers need to be addressed. Also, accurately locating the objects within the VR content, either during pre-recorded transmissions or on-the-fly for live transmissions, can require implementation of processor-intensive video analysis. The examples disclosed herein provide solutions to such technological problems of appropriate identification of objects, accurate determination of the spatial and temporal positioning of the hotspots corresponding to the objects within the dynamic VR environment and selecting optimal ancillary content for the identified objects. Such interactivity further addresses the technical problem of being able to merge ecommerce activities with VR content. For example, current VR systems require viewers to exit the VR environment and access other electronic devices to carry out routine tasks such as purchasing goods online, updating orders, receiving status updates of orders and the like. The ancillary content can include ecommerce content with widgets that enable ecommerce activities defined herein. As a result, routine ecommerce tasks may also be executed by the viewer without exiting the VR environment.

FIG. 1 shows a schematic diagram of an intelligent virtual reality (IVR) system 100 in accordance with one example. The IVR system 100 receives a VR content item 102, identifies hotspots 104 within the VR content item 102 to which ancillary content 106 or additional content is associated. An interactive VR (IVR) content item 140 with the hotspots 104 and the ancillary content 106 or access mechanism such as links to the ancillary content 106 is transmitted to a HMD 120 for display to a viewer. Different HMDs are available ranging from expensive equipment such as OCCULUS RIFT, VIVE to the much less expensive Google cardboard.

In an example, the VR content item 102 can be a pre-recorded content item. In another example, the VR content item 102 can be a live video stream of an event such as a sports event, an entertainment event such as a concert and the like. The IVR system 100 includes a detector 112 which analyzes the VR content item 102 to identify predefined valid objects therewithin which are suitable for receiving or associating with ancillary content. The received VR content item 102 can include various objects from which the IVR system 100 identifies the valid objects. Valid objects are those objects with uniquely identifiable imagery for which ancillary content exists within the IVR system 100 for coupling thereto. In sporting or entertainment event examples mentioned above, the valid objects can be predetermined objects such as but not limited to text or logos associated with various brands, people participating or viewing the event, particular locations or tools of the event that can receive viewer attention such as the balls, the playing fields, goal posts, score boards and the like which are located within the event arena and which are visible during the course of the VR content item 102. The ancillary content 106 that is associated with such valid objects may include advertisements or informational content in some examples.

The IVR system 100 also includes an augmenter 114 which obtains the identity along with the spatial and temporal positioning information of the valid objects within the VR content item 102 and employs such information to obtain the corresponding ancillary content 106 either from a local database or from a third party database such as an ancillary content source 110. As mentioned herein, the ancillary content 106 can be customized to particular objects with their spatial and temporal coordinates. If the predefined objects pertain to logos or text such as advertisement slogans, the augmenter 114 can employ their respective identification information to determine if the ancillary content source 110 includes particular images, video, an informational slide or other creative associated with the logos or text. The spatial coordinates of the pixel blocks including a valid object can be used to determine the size of display of an ancillary content item that is to be displayed when a viewer interacts with a hotspot associated with that valid object. In some examples, the temporal coordinates of the valid object (which determine the time period of display of the valid object) can be similarly employed to determine the time period for which one or more of the hotspot and the ancillary content is displayed. The time period of display of the valid object can be obtained by determining, for example, the number of video frames in which the valid object appears within a given set of pixel box coordinates. In examples such as videos, where the valid object is in motion, the corresponding hotspot or ancillary content can have position coordinates that track or correspond to the trajectory of the valid object in motion.

In certain examples, a particular type of ancillary content can be associated with a brand or logo which may also include mechanisms that allow viewers to purchase products associated with the brands without exiting the VR environment. Similarly, if the identified text pertains to a person such as a player in a sporting event, the ancillary content can include information related to the player's statistics or if the person is a celebrity attending an event then the ancillary content can include the latest news or social media activity of the celebrity and the like. If the object includes a place or a particular physical object such as a football field, then the ancillary information may include a brief history of the place with links to detailed information sources and the like. In an example, a pointer may be displayed in a non-intrusive manner, using techniques such as transparent overlays or gleams for example, signaling to the viewer that a hotspot is located with a particular predefined object. If the viewer chooses to select or otherwise interact with the hotspot, the creative associated with the hotspot may be displayed to the user.

The IVR system 100 also includes a content transmitter 116 which transmits the IVR content item 140 along with the objects, their corresponding hotspots 104 and the ancillary content 106 associated therewith to a HMD 120 for display to the viewer. A database 130 can also be included within the IVR system 100 for storing data associated with the various processes of receiving the VR content item 102, identifying hotspots 104 within the VR content item 102 and associating the ancillary content 106. In an example, the database 130 may also store data for training the detector 112 to identify valid objects within the VR content item 102 that are suitable for receiving the hotspots 104.

In an example, the IVR system 100 can be coupled to an ecommerce system 150 so that ecommerce activities are enabled via the hotspots 104. For example, the ancillary content 106 displayed to a viewer via the hotspots 104 can include items for sale. When selected by the viewer, the IVR system 100 may receive a request from the HMD 120 for access to the ecommerce system 150 and provides the viewer access to the ecommerce system thereby enabling purchases of the items without the need for the viewer to exit the VR environment to purchase desired items.

The HMD 120 includes a content receiver 122 which receives the IVR content item 140 and displays the various elements of the IVR content item 140 based on the script or code received with the IVR content item 140. Accordingly, based on the indicia of valid objects and coordinates of the hotspots 104, the respective hotspots are displayed by the hotspot generator 124 to coincide with positions of each of the valid objects to a viewer. In an example, the positions of the hotspots can be retrieved as spherical coordinates to enable accurate positioning of the hotspots within a display of the VR content item 102. When the viewer selects one of the hotspots 104, the corresponding ancillary content is displayed to the viewer by the ancillary content provider 126. One or more of the content receiver 122, the hotspot generator 124 and the ancillary content provider 126 can be coded in various markup languages and/or scripts such as but not limited to Javascript.

Although 3D videos for VR systems are described herein, it can be appreciated that the methods for identifying appropriate positions for hotspots and enabling access to ancillary content described herein is equally applicable to 2D content or any panoramic video.

Figure 2:
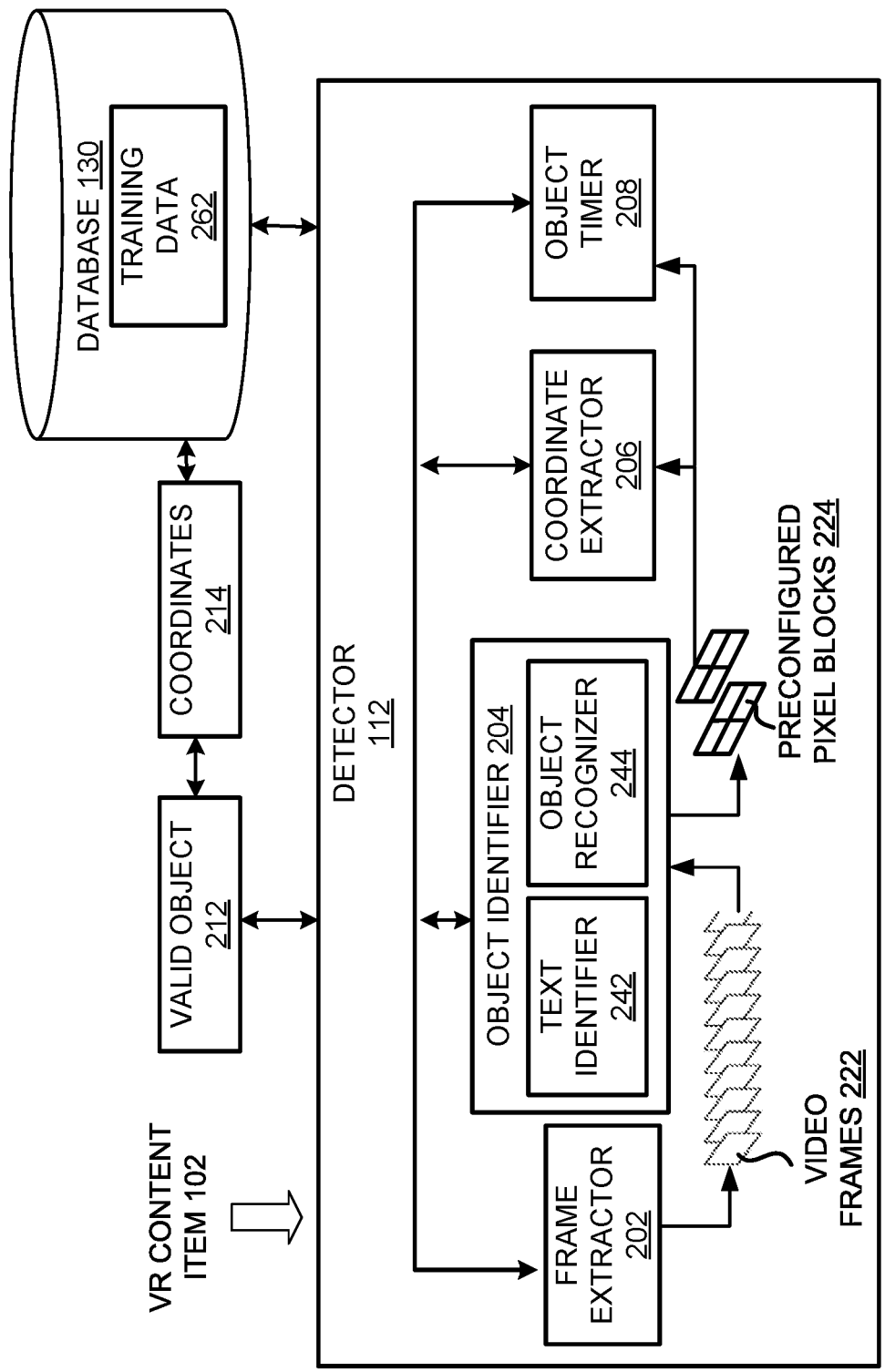
FIG. 2 is a block diagram showing the components of a detector in the IVR system accordance with one example.

FIG. 2 is a block diagram showing the components of the detector 112 in accordance with one example. The detector 112 includes a frame extractor 202, an object identifier 204, a coordinate extractor 206, and an object timer 208. The frame extractor 202 extracts the video frames 222 from the VR content item 102. In an example, tools such as but not limited to, FFMPEG can be used to extract the frames. The video frames 222 are accessed by the object identifier 204 which identifies various objects within the video frames. The objects recognized within the video frames 222 can include but are not limited to images of text such as from the hoardings advertising products at an event imaged in the VR content item 102 and images of living and non-living entities such as performers in an event, logos displayed at various points such as on the hoardings, performer(s) apparel, grounds, spectators, objects of interest such as the balls at various ball games and the like.

The object identifier 204 includes a text identifier 242 which can be trained to identify textual objects which can include images of textual characters or letters of a language from the images in the video frames 222 via a simple analytical procedure. The text identifier 242 can employ mechanisms such as but not limited to GOOGLE Vision which may employ one or more of textual processing or artificial intelligence techniques including those of image processing for quick recognition of textual data. The object identifier 204 also includes an object recognizer 244 that identifies various non-textual objects mentioned above from the video frames 222 using machine learning (ML) models trained to identify various images of non-textual objects. In an example, the object identifier 204 periodically selects one of the video frames 222 and processes the selected video frame via an iterative process to divide it into preconfigured pixel blocks 224 to isolate those pixel blocks which actually include the non-textual objects. By the way of illustration and not limitation, the object recognizer 244 can be configured to dissect each selected video frame into a 100×100 pixel blocks.

The preconfigured pixel blocks 224 are processed using for example, pattern matching procedures to identify various valid objects. The valid objects can include those objects which have ancillary content associated therewith. For example, a specific brand logo may have a VR advertisement video stored in the ancillary content source 110 so that whenever a hotspot associated with the brand logo is selected, the advertisement video is played. The pattern matching procedure implemented by the object recognizer 244 may be trained to identify the brand logo as a valid object. For example, training data 262 provided to the object recognizer 244 can include various images of a non-textual object to be identified. On the other hand, the pattern matching procedure may not be trained to identify another brand logo or non-textual object which is present in the video frames 222 and does not have any associated ancillary content within the ancillary content source 110. Hence the other brand logo would not be recognized as a valid object. In another example, the object recognizer 244 may recognize as a valid object, such as, a performer participating in the event filmed in the VR content item 102. Methodologies for facial recognition can be implemented for identifying people in the VR content item 102. Accordingly, information regarding the performer such as the performer's bio-data, relevant social media content and the like may be displayed as ancillary content within the IVR content item.

When a valid object 212 is detected by the object identifier 204, the video frame including the valid object 212 is made accessible to the coordinate extractor 206 and the object timer 208. The coordinate extractor 206 accesses the video frame including the valid object to identify one or more of the preconfigured pixel blocks within the video frame that include the valid object. The coordinate extractor 206 may identify the preconfigured pixel blocks 224 within the video frame containing the valid object in terms of their coordinates 214. In an example, the coordinate extractor 206 can represent the coordinates 214 in the Cartesian system. The video frames 222 are extracted in substantially 2D plane while the HMD 120 displays the videos in 3D. Accordingly, the coordinate extractor 206 is further configured to convert the Cartesian coordinates to spherical coordinates in terms of radius r and angle G. In addition, the detector 112 may further include an object timer 208 which further extracts a time of appearance of the valid object 212 or the timing of the frame containing the valid object 212 within the VR content item 102. The timing may be recorded relative to the beginning of the VR content item 102 or the timing can be recorded based on a system time associated with the IVR system 100.

Figure 3:
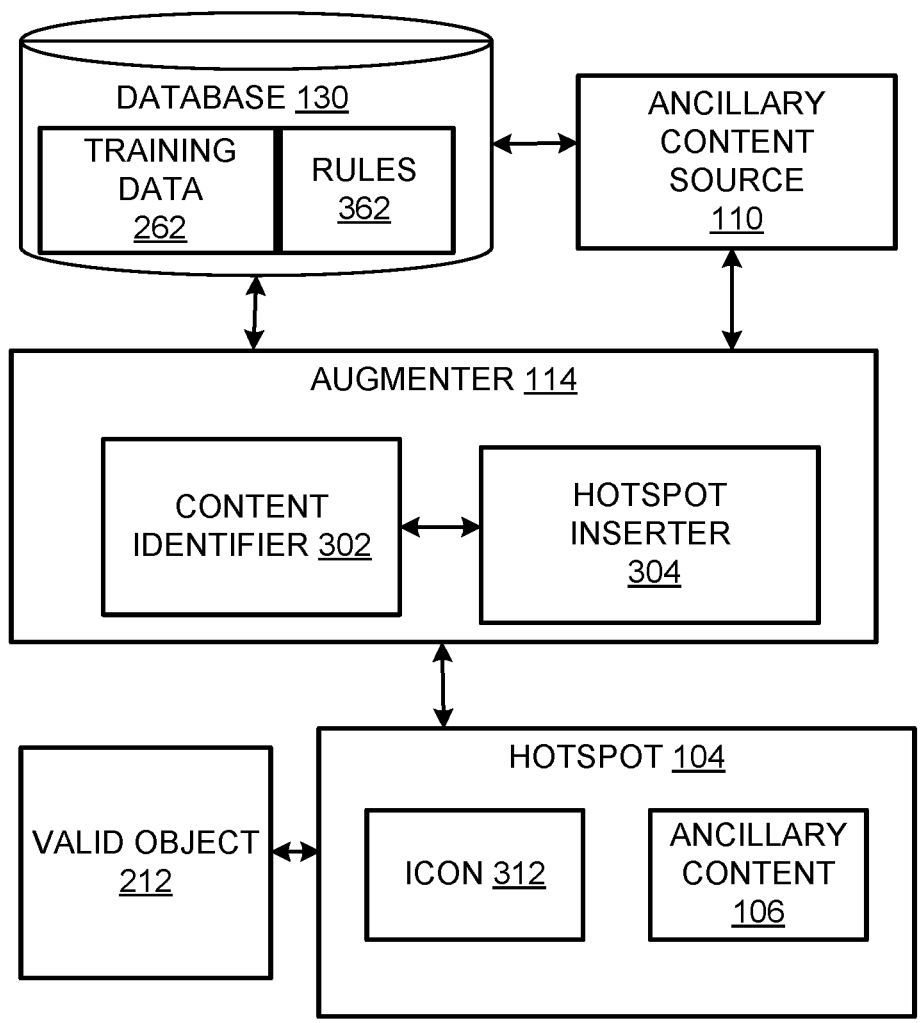
FIG. 3 is a block diagram of an augmenter in the IVR system in accordance with one example.

FIG. 3 is a block diagram of the augmenter 114 in accordance with one example. The augmenter 114 includes a content identifier 302 which obtains the identity information (e.g., a unique identifier) such as tags, keywords and the like of the valid object 212 to obtain the ancillary content 106 from the ancillary content source 110. It can be appreciated that the ancillary content source 110 can be any content source such as an ad server, a search engine, a proprietary database and the like that is local or external to the IVR system 100. The content identifier 302 can use the identity information of the valid object 212 to find matching content from the ancillary content source 110. For a valid object 212 such as a brand logo or an advertising tagline, a matching advertisement can be identified. In an example, the matching advertisement may additionally conform to the size of the brand logo as displayed in the VR content item 102. In an example, the size of the brand logo can be estimated by the content identifier 302 so that in addition to the actual content, the size of the ancillary content item may be suitably optimized for presentation within a display area of the valid object 212. The size of the ancillary content presentation area may vary based on the number of preconfigured pixel blocks that the brand logo extends to. The matching of the ancillary content 106 to the valid objects and associated hotspots can be governed by the rules 362 which specify the types and sizes of ancillary content that is to be paired with valid objects of particular sizes and positions within the VR content item 102.

The augmenter 114 also includes a hotspot inserter 304 which configures hotspots 104 within the IVR content item 140. The hotspot 104 may additionally be associated with an icon 312 which can indicate the presence of the hotspot 104 to a viewer. In an example, the icon 312 may be configured based on the operating system or user preferences that are set within the HMD 120. The hotspot 104 can further be configured to include one or more of the ancillary content 106 or a link to the ancillary content 106. In an example, Unreal Engine that supports development for VR devices such as OCULUS RIFT can be used to augment the hotspots 104 with the ancillary content 106 and enable presentation of the ancillary content 106 as the hotspots 104 are selected by the user. Thus, as a viewer views the portion of the IVR content item 140 including a hotspot, an icon is automatically displayed which indicates the presence of the hotspot to the viewer thereby encouraging further viewer interaction which results in the display of the ancillary content.

Figure 4:
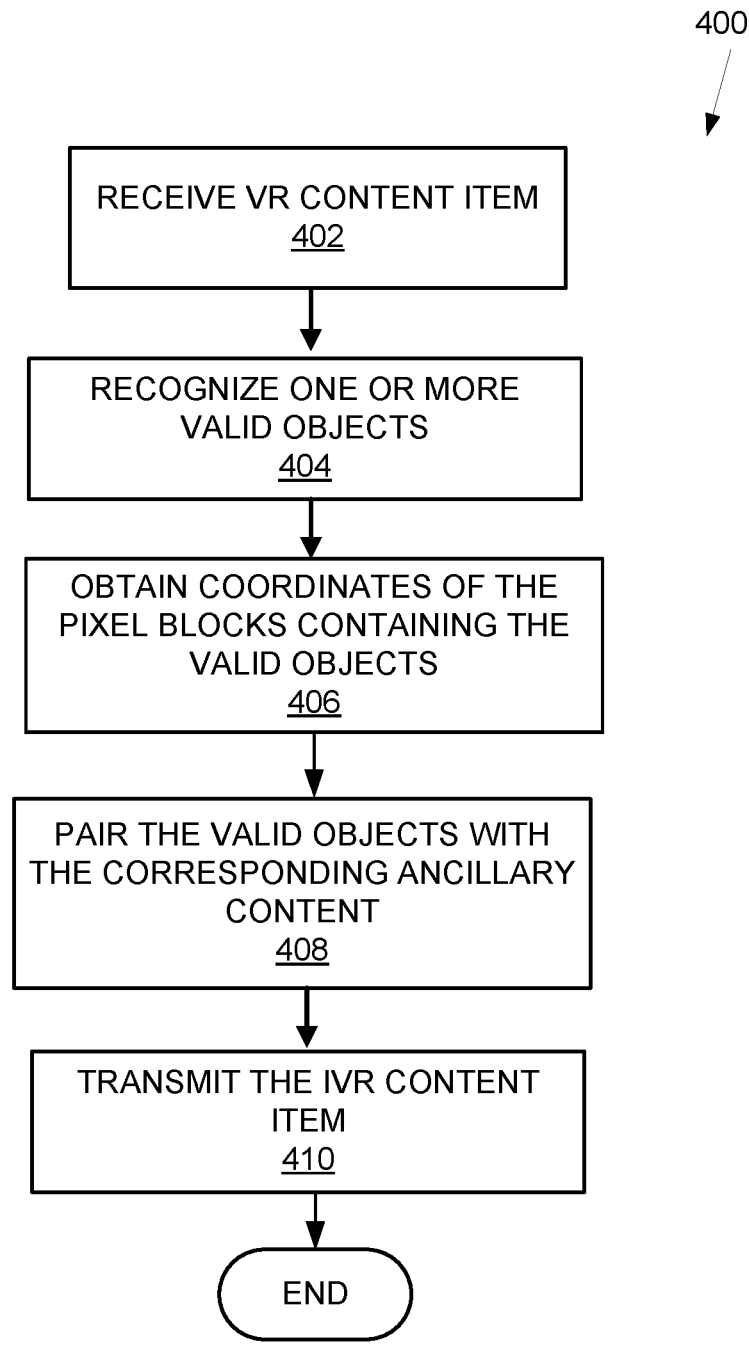
FIG. 4 is a flowchart that details a method of providing access to ancillary content within a VR content item in accordance with one example.

FIG. 4 is a flowchart 400 that details a method of providing access to ancillary content within a VR content item in accordance with one example. The method begins at 402 wherein a VR content item 102 is received. At 404, one or more valid objects are recognized from the VR content item 102. The coordinates of the pixel blocks containing the valid objects within a given video frame are determined at 406 using the iterative splitting procedure as detailed herein. The coordinates may be initially determined in 2D using the Cartesian coordinate system and are later transformed into spherical coordinates to determine the position of the valid objects within the 360 degree rendering produced by the HMD 120. The valid objects identified at 404 are paired with the corresponding ancillary content at 408 using the rules 362 to generate the IVR content item 140. The rules 362 may not only specify positional and temporal coordinates regarding where and when the ancillary content is to appear within the IVR content item 140 but the rules 362 can also specify the type of ancillary content to be paired with a given hotspot. Also, based on the size of the image of the valid object, the size of a display for the ancillary content 106 within the VR view field can be determined. In an example, the position and display size of the ancillary content for a given valid object can coincide with the position coordinates of the respective pixel blocks containing the valid object. For a valid object that occupies a small portion of the VR image display, a static image can be provided as ancillary content whereas if the valid object takes up a larger portion of the display a larger static image or even a video can be associated as ancillary content. The IVR content item 140 including the VR content item 102 along with the hotspots 104 and the ancillary content 106 is transmitted to the HMD 120 at 410 for display to the viewer.

Figure 5:
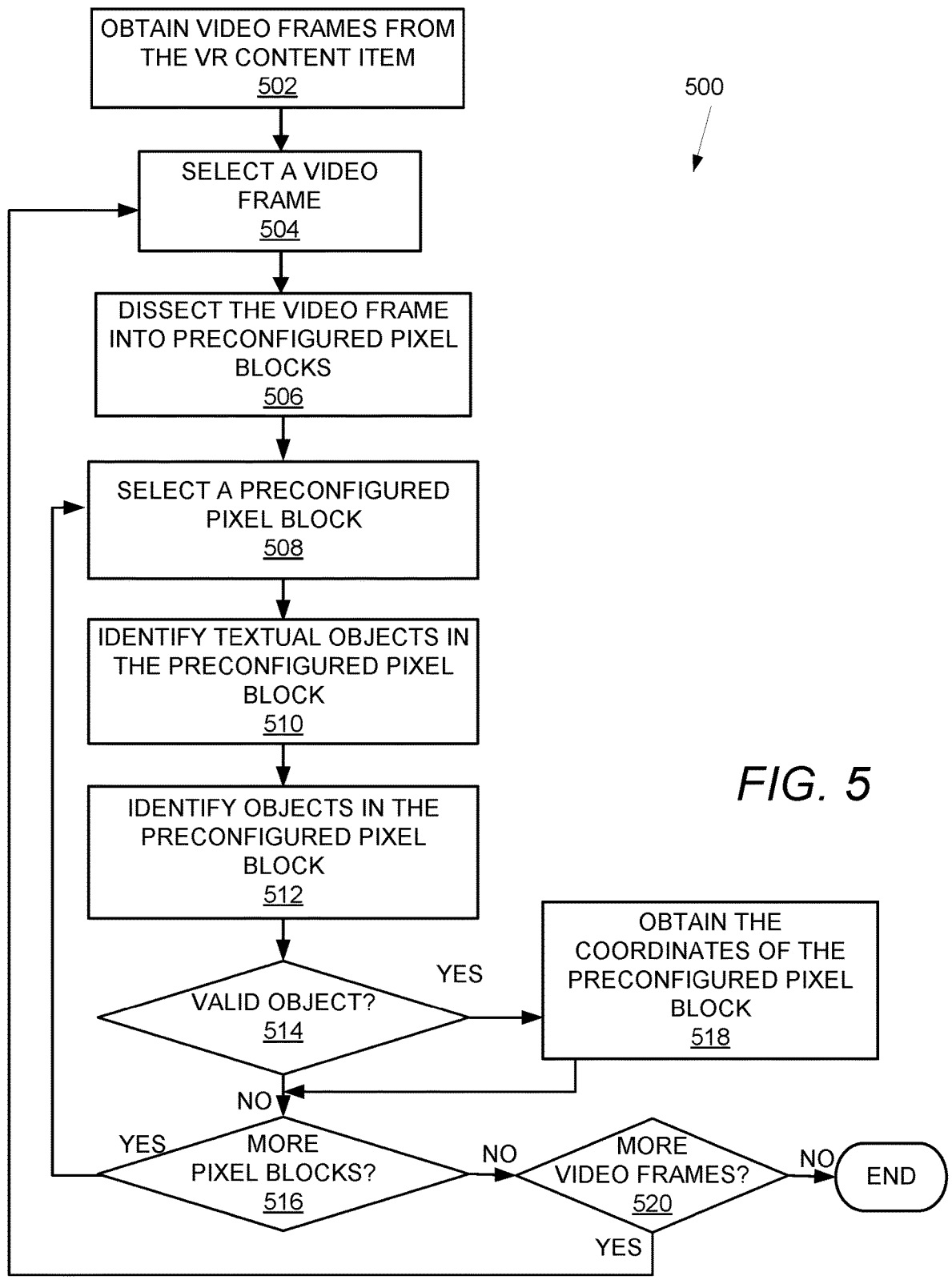
FIG. 5 is a flowchart that details a method of identifying valid objects from the VR content item in accordance with an example.

FIG. 5 is a flowchart 500 that details a method of identifying valid objects from the VR content item 102 in accordance with an example. The method begins at 502 wherein the VR content item 102 is processed to extract the video frames along with the respective time stamps. At 504, a video frame is selected for further analysis to determine the presence of a valid object. A subset of video frames can be generated by periodically selecting from the video frames extracted from the VR content item 102. The subset of video frames can be analyzed to detect the valid objects which can include but are not limited to images of textual content such as brand names, advertisement tag lines or any other textual content that may appear in the VR content item or images of living, non-living entities. It can be appreciated that the periodicity in selecting the video frames can be balanced so that the computational intensity is reduced while the video frames are examined often enough that the display period of a valid object within live streaming VR content such as a logo and hence the time of exposing ancillary content such as an advertisement is not missed. The frequency of selection of video frames can depend on factors such as the length of the VR content item 102 (if known), the genre of the content and the like. Generally, I frames may be extracted to capture the most information.

The selected video frame is dissected at 506 via an iterative splitting procedure into a plurality of pixel blocks 224 of preconfigured sizes e.g., 100×100 pixels. Each of the pixel blocks from the dissected video frame is subjected to various analytical processes to detect the presence of valid objects within the selected video frame. Accordingly, a preconfigured pixel block is selected at 508. At 510, the preconfigured pixel block is processed thorough a simple analytical procedure using for example, GOOGLE vision in order to identify textual objects. Textual objects including images with textual content such as but not limited to advertisement hoardings, name of a player/performer (e.g., on a player's clothes), identity of a locale such as an event venue, signs held by spectators or any other kind textual objects may be identified at 510. The preconfigured pixel block is also processed at 512 via a more complex analytical procedure using pattern matching procedures to identify non-textual objects. Pattern matching procedures that are currently available can be used to identify the objects. For example, custom trained Tensor flow analysis can be used to identify the non-textual objects.

At 514 it is determined if the identified textual and non-textual objects are valid objects which may have ancillary content associated therewith. If the identified objects are not valid objects, the pixel block may be discarded without further processing and the method moves to determine at 516 if there are further pixel blocks remaining for processing. If yes, the method returns to 508 to select the next preconfigured pixel block for processing. If no further pixel blocks remain, the method terminates on the end block. If at 514, it is determined that the object is a valid object, the method proceeds to obtain the coordinates of the preconfigured pixel block within the selected video frame at 518.

The preconfigured pixel blocks 224 obtained from a video frame are substantially 2D structures. Therefore, the coordinates of the valid objects obtained at 518 are converted to spherical coordinates when being displayed by the HMD 120 in order to provide the viewer with depth perception. Below are some example formulae that can be employed for the conversions. More particularly, X, Y coordinates are converted to R, theta ($\theta$) and rho ($\rho$) where R is the radius of a unit sphere.

$R=50*\text{scale}$ (where scale is the number of times the image is to be magnified)   Eq. (1)

$\theta=(u-u')/u'^{*}(-180)$   Eq. (2)

$\rho=(v'-v)/v'^{*}90$   Eq. (3)

In Eqs. (2) and (3), u' and v' are coordinates of the video center as a measure on the axes and u and v are the actual coordinates of the random object as received. Converting R, $\rho$ to Z:

$Z=R\sin(\rho)$   Eq. (4)

Using R, $\theta$ and rho $\rho$, X and Y can be obtained:

$X=R\cos(\rho)*\sin(\theta)$   Eq. (5)

$Y=R\cos(\rho)*\cos(\theta)$   Eq. (6)

The equations for coordinate transformations are given above assuming that that the VR content item 102 is a 360 degree video. However, different camera configurations may be used to shoot a N degree video, where N degree video can include a 180 degree video or a 270 degree video for the VR content item 102. If the VR content item 102 includes a 180 degree video, Eqs. (1), (3), (4), (5) and (6) remain the same while the equation for theta ($\theta$) will be:

$\theta=(u-u')/u'^{*}(-90)$   Eq. (7)

Similarly, the equation for theta ($\theta$) when the VR content item 102 includes a 270 degree video will be:

$\theta=(u-u')/u'^{*}(-135)$   Eq. (8)

Generally, the detector 112 can be configured to obtain the metadata of the VR content item 102 in order to be further employed in pairing ancillary content to the hotspots and the like. In an example, technical metadata of the VR content item 102 may include information regarding whether the VR content item 102 is a 180 degree, 270 degree or a 360 video. Accordingly, the technical metadata is fetched along with the VR content item 102 from a content source or a backend in order to determine the correct procedure to be used for the conversion discussed above.

The method then proceeds to 516 to determine if further preconfigured pixel blocks remain for processing. If yes, the method returns to 508 to select the next preconfigured pixel block for processing. If no further pixel blocks remain for processing in the current video frame the method proceeds to 520 to determine if further video frames exist for processing. If no further video frames remain to be processed, the method terminates on the end block. If more video frames remain for processing, the method returns to 504 to select the next video frame.

Figure 6:
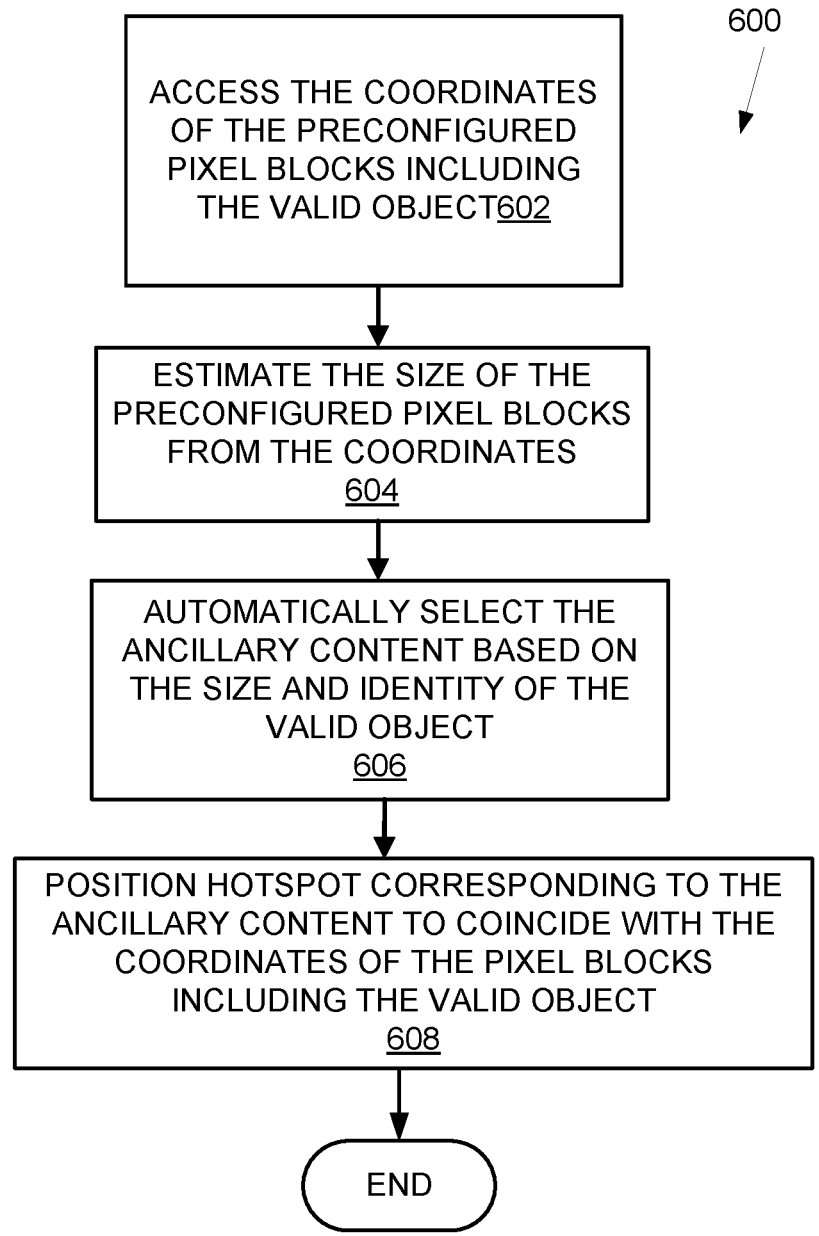
FIG. 6 is a flowchart that details a method of configuring a hotspot associated with a valid object in accordance with one example.

FIG. 6 is a flowchart 600 that details a method of coupling a hotspot to a valid object and automatically selecting ancillary content for the hotspot in accordance with one example. The method begins at 602 wherein the coordinates of the preconfigured pixel blocks which include the valid object(s) for the given hotspot are accessed. The size of the preconfigured pixel blocks is estimated from the coordinates at 604. Based on the size of the preconfigured pixel blocks and the identity of the valid object, the ancillary content can be selected automatically at 606. An ancillary content piece which has size and time constraints that suit the size of the preconfigured pixel blocks and the time for which the valid object remains in view is selected. While the VR content item 102 is a pre-recorded program, the hotspots and their ancillary content may be pre-determined. However, when the VR content item 102 is a live stream of an event as it occurs, the selection of ancillary content at 606 based on size and time constraints of the valid objects can enhance the viewer's VR experience without undue interruptions. The hotspot with a user interface element (such as a link to the ancillary content) is included in the IVR CONTENT ITEM 140 at 608 so that the position of the hotspot providing access to the ancillary content coincides with the coordinates of the pixel blocks including the valid object.

Figure 7:
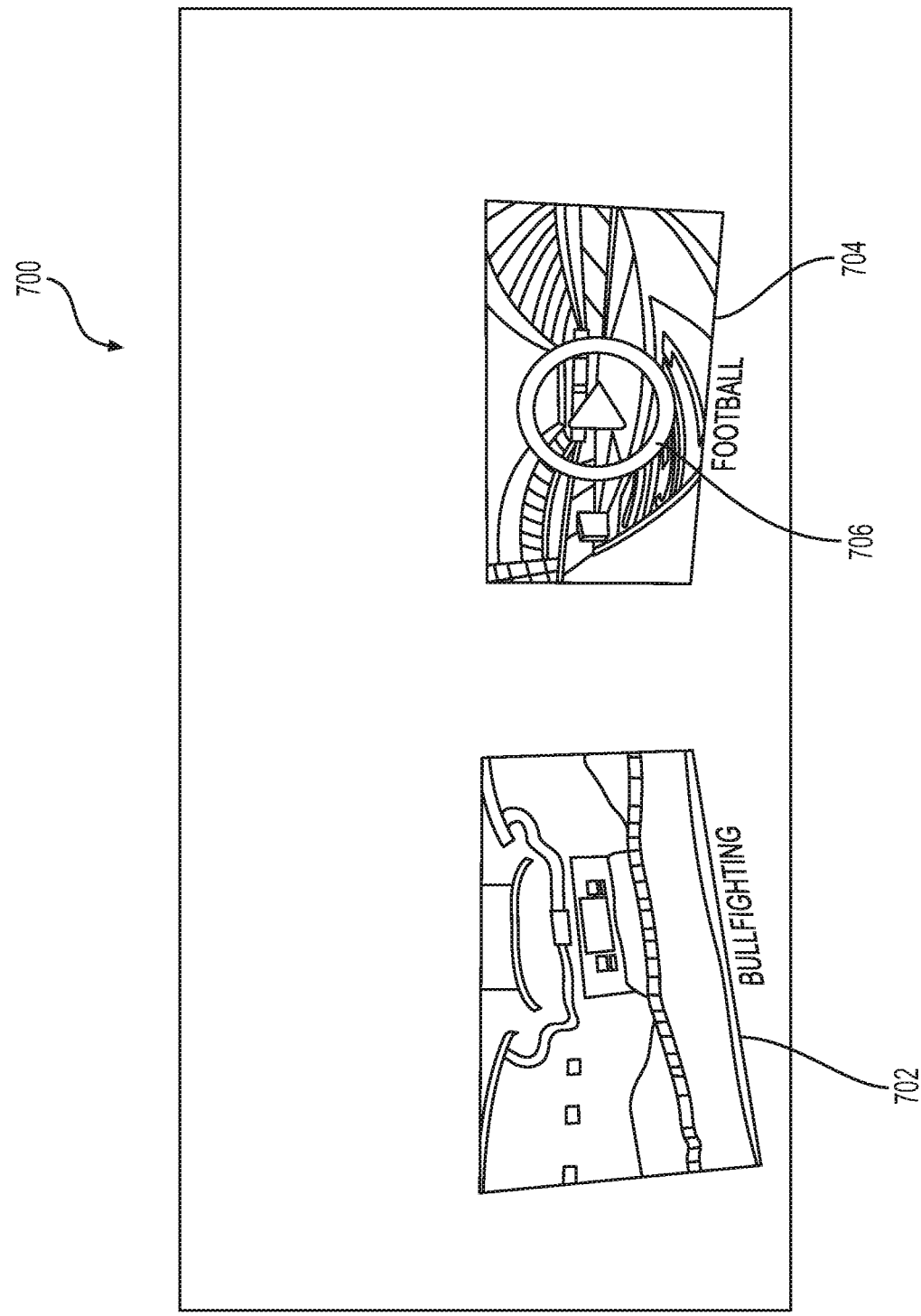
FIG. 7 illustrates a user interface that provides a choice of two events in accordance with an example.

FIG. 7 illustrates a user interface 700 that provides a choice of two events, a bullfighting event 702 and a football match 704 to a viewer via the HMD 120. The user interface 700 shows the display that the viewer may view on the HMD 120. In an example, the events 702, 704 may be watched live by the viewer as they are occurring at the respective event venues. The user interface 700 may include controls such as the play button 706 overlaid on a display of the HMD 120. The viewer may select the controls either via voice commands or via gestures which the HMD 120 may be programmed to recognize.

Figure 8:
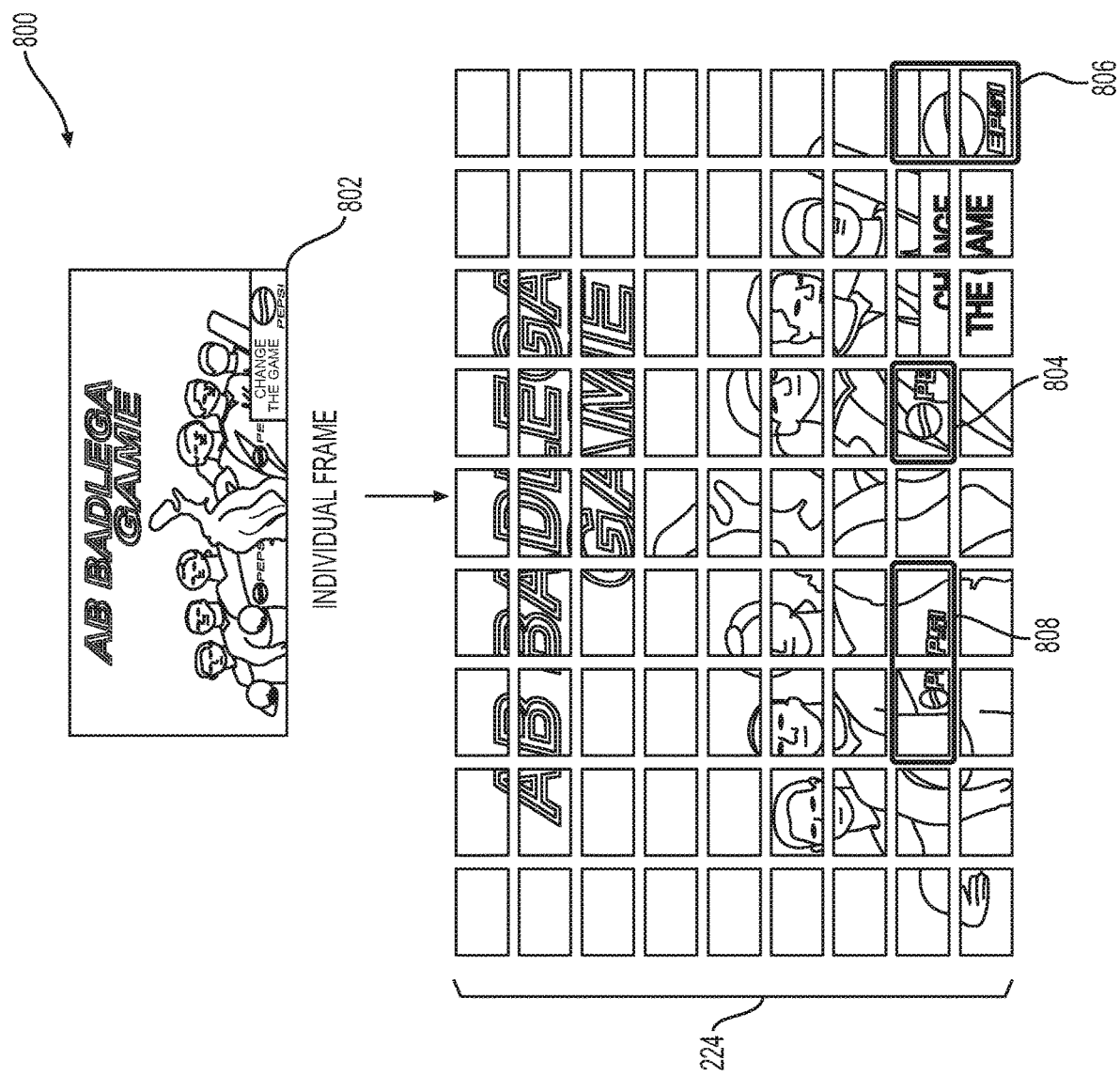
FIG. 8 is an illustration that shows how valid objects are recognized within video frames in accordance with examples described herein.

FIG. 8 is an illustration 800 that shows how valid objects are recognized within video frames in accordance with examples described herein. An individual video frame 802 is dissected into a plurality of preconfigured pixel blocks 224 by employing an iterative splitting procedure as detailed above. Pattern matching procedures are then employed to identify valid objects. In the illustration 800, the valid objects can include one or more of a brand logo and a brand name. Multiple positions 804, 806 and 808 within the video frame 802 are identified as containing valid objects including the brand logo and/or the brand name. The position information of the preconfigured pixel blocks corresponding to the positions 804, 806 and 808 is also extracted by the iterative dissection procedure. In an example the position information may be extracted in terms of Cartesian coordinates relative to the edges of the video frame so that the coordinates of the positions 804, 806 and 808 are stored as {(290, 639), (290, 681), (394, 681), (408, 639)}. The Cartesian coordinates thus obtained are converted into spherical coordinates as detailed herein for display to the user through the HMD 120.

Figure 9:
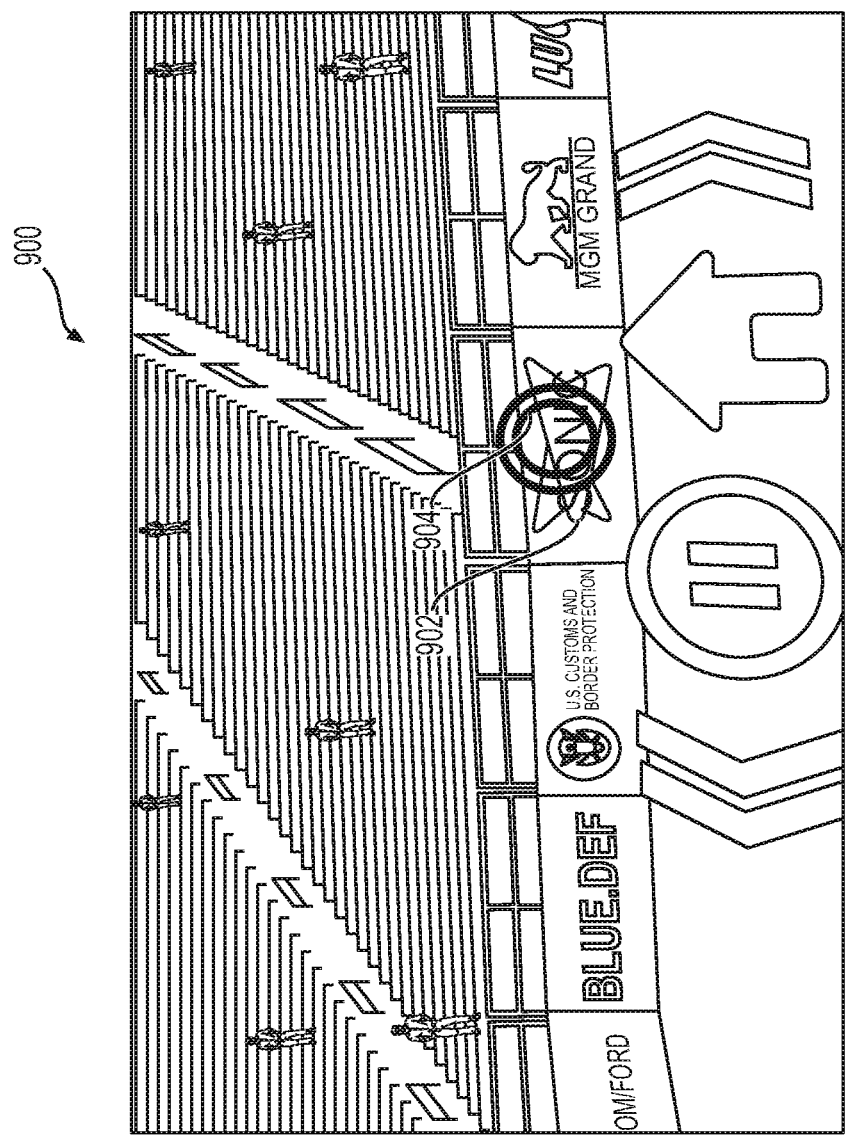
FIG. 9 shows a valid object display that is generated when a valid object is identified within the VR content stream.

FIG. 9 shows a valid object display 900 that is generated when a valid object is identified within the VR content stream. In the display 900, a valid object in the form of a brand logo 902 for SONIC is identified and an icon 904 is displayed indicating the presence of a hotspot to the viewer thereby encouraging viewer interaction. In an example, selection of the hotspot can result in playing an ad or providing information regarding the products/services associated with the brand. In an example, an ecommerce widget may also be displayed so that further selection of the widget may allow the viewer to order food or drinks from a SONIC outlet without having to exit the VR environment. Hence, the viewer can continue to watch the event even while conducting other tasks. In another example, the advertisements displayed in the HMD 120 can include a targeted ad campaign based on a user profile of the viewer using the HMD 120.

Figure 10:
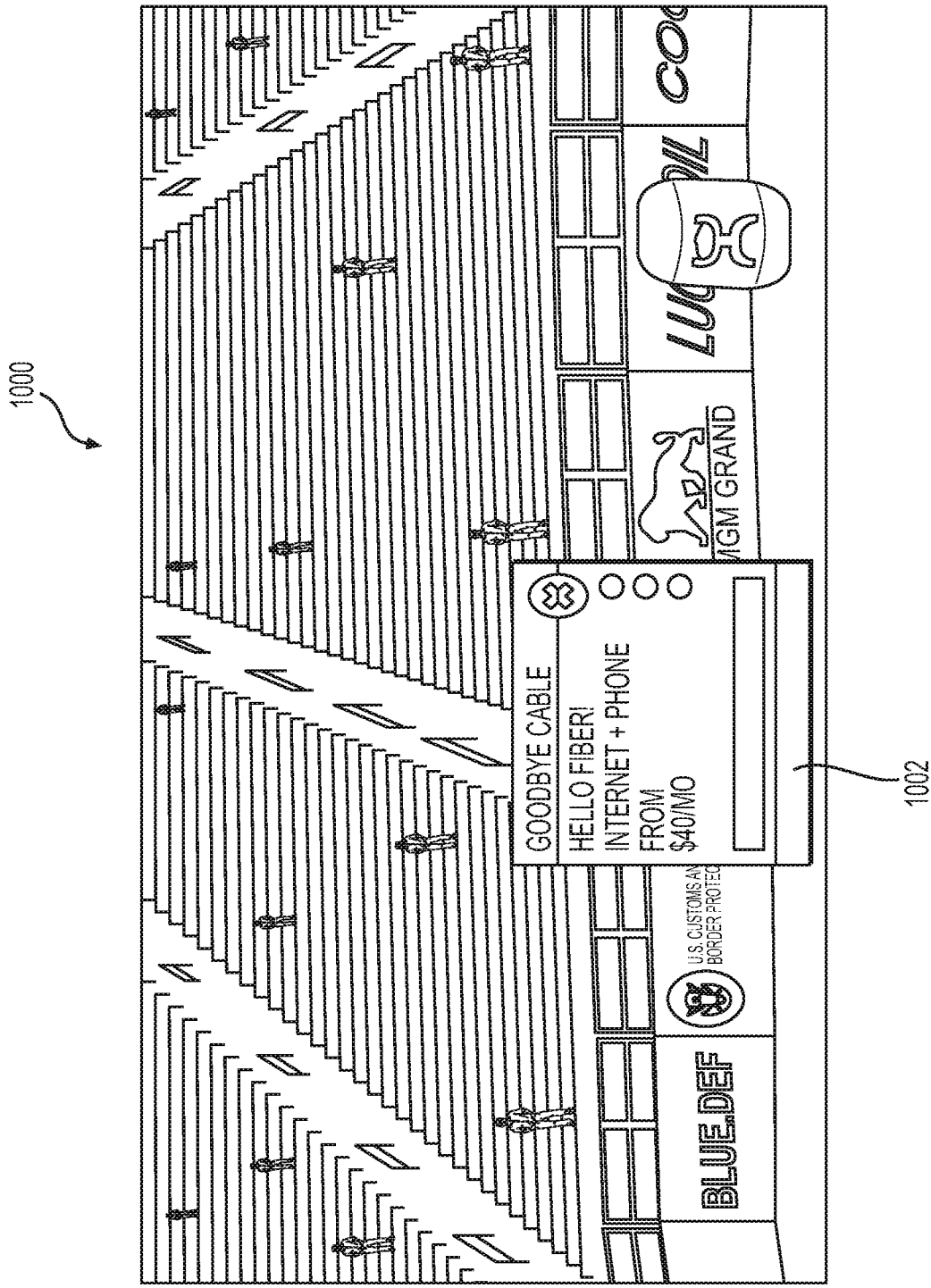
FIG. 10 shows a display of the ancillary content that is generated when the viewer chooses to interact with a hotspot.

FIG. 10 shows a display 1000 of the ancillary content that is generated when the viewer chooses to interact with a hotspot. In the display 1000, ancillary content such as the advertisement 1002 is displayed. Based on the identity and size of the valid object associated with the hotspot, the ancillary content which is transmitted with the IVR content item 140 or which is linked to the IVR content item 140 may be retrieved and displayed to the viewer.

Figure 11:
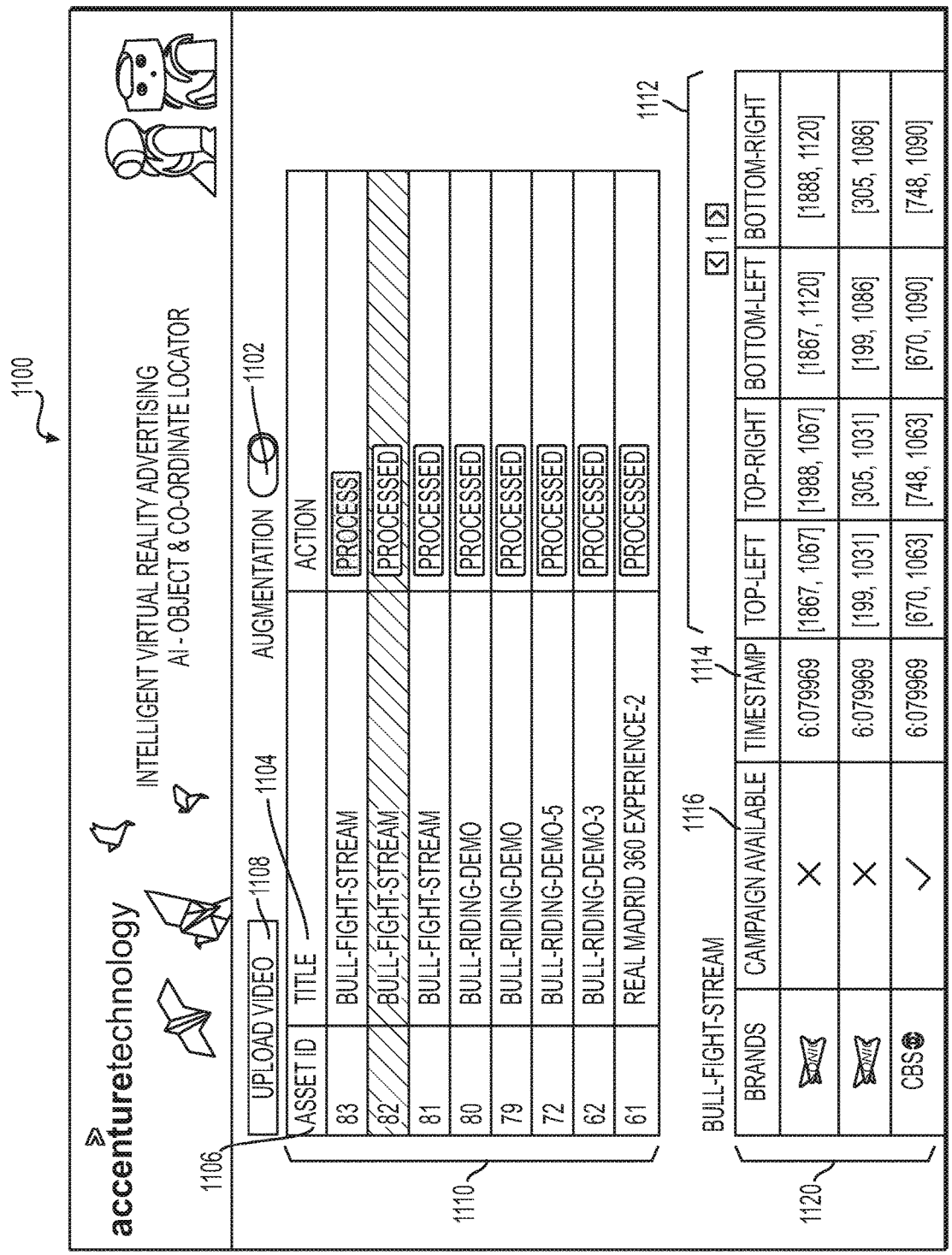
FIG. 11 shows a user interface that includes valid objects with their respective ancillary content.

FIG. 11 shows a user interface 1100 that includes valid objects with their respective ancillary content as recognized by the IVR system 100 from the bullfighting VR content item shown in FIG. 7. An upper portion 1110 of the user interface 1100 includes an augmentation switch 1102 which can be toggled to switch on or off the augmentation of the valid objects. When switched on, the augmentation switch 1102 causes the IVR system 100 to begin the process of identifying valid objects within the VR content item 102 and augmenting the valid objects with the corresponding ancillary content. The valid objects identified in the VR content item are stored with a respective title 1104 and a respective asset id 1106. The presentation of the IVR content item 140 to the HMD 120 may be commenced via operating an upload video button 1108. In an example, a display on the HMD 120 can also implement an augmentation switch via, e.g., scripting, so that a viewer may also toggle the hotspot display as desired.

The lower portion 1120 of the user interface 1100 includes the placement or position information 1112 of the valid objects or logos as determined by the IVR system from within a content stream of the VR content item. The lower portion 1120 also includes a time stamp 1114 for valid objects and presence or absence of ancillary content for the valid objects 1116 within the VR content item which in the current example, is a bullfighting event may also be included.

Figure 12:
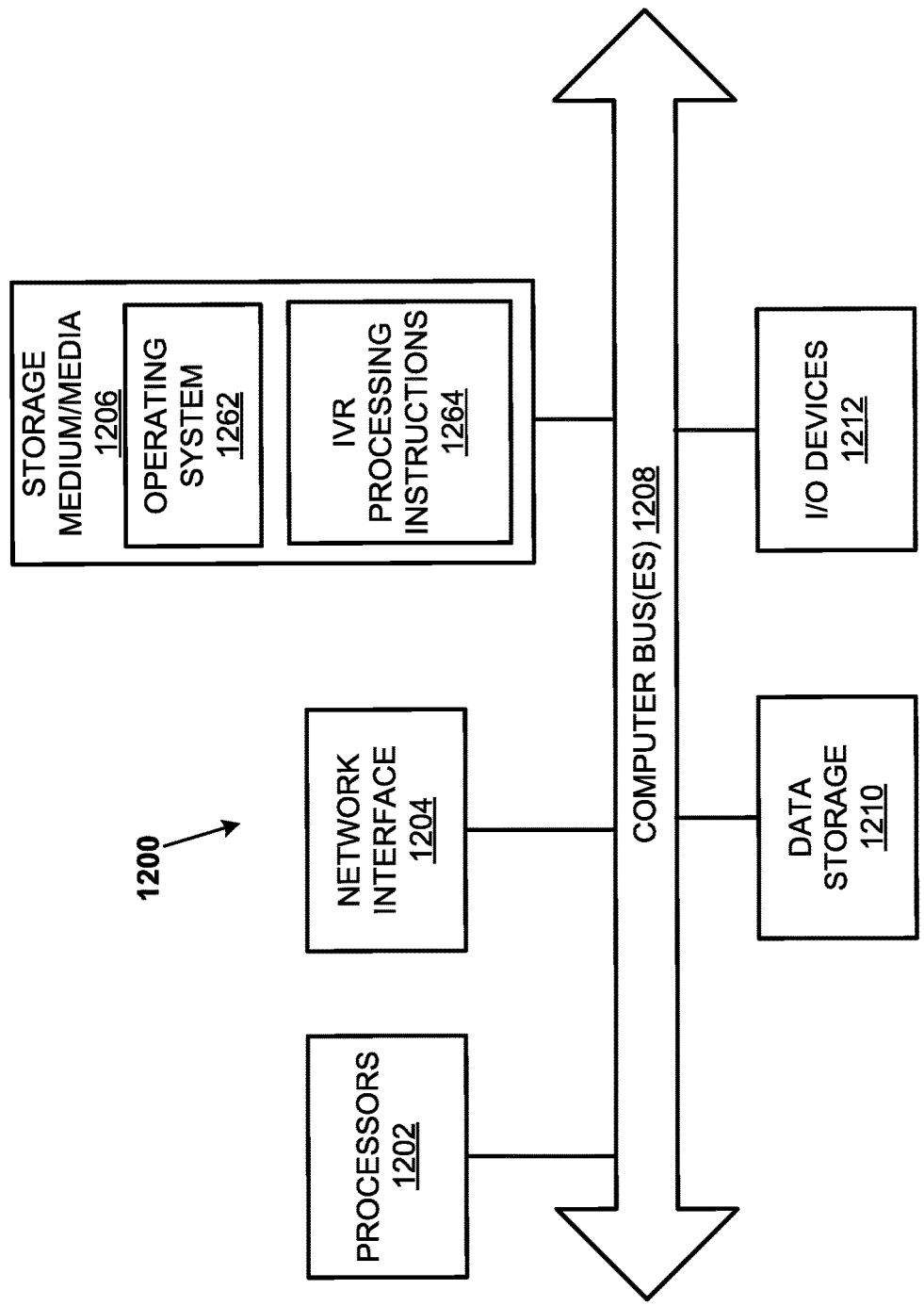
FIG. 12 illustrates a computer system that may be used to implement the IVR system, according to an example.

FIG. 12 illustrates a computer system 1200 that may be used to implement the IVR system 100. More particularly, computing machines such as desktops, laptops, smartphones, tablets, wearables which may be used to generate, host and transmit interactive VR content may have the structure of the computer system 1200. The computer system 1200 may include additional components not shown and that some of the components described may be removed and/or modified.

The computer system 1200 includes processor(s) 1202, such as a central processing unit, ASIC or other type of processing circuit, input/output devices 1212, such as a display, mouse keyboard, etc., a network interface 1204, such as a Local Area Network (LAN), a wireless 802.12x LAN, a 3G or 4G mobile WAN or a WiMax WAN, and a computer-readable medium 1206. Each of these components may be operatively coupled to a bus 1208. The computer-readable medium 1206 may be any suitable medium which participates in providing instructions to the processor(s) 1202 for execution. For example, the computer-readable medium 1206 may be non-transitory data storage or non-volatile medium, such as a magnetic disk or solid-state non-volatile memory or volatile medium such as RAM. The instructions or modules stored on the computer-readable medium 1206 may include machine readable instructions 1264 executed by the processor(s) 1202 to perform the methods and functions for IVR system 100. The computer-readable medium 1206 may also store an operating system 1262, such as MAC OS, MS WINDOWS, UNIX, or LINUX. The operating system 1262 may be multi-user, multiprocessing, multitasking, multithreading, real-time and the like. For example, during runtime, the operating system 1262 is running and the instructions 1264 are executed by the processor(s) 1202.

The computer system 1200 may include a data storage 1210, which may include non-volatile data storage. The data storage 1210 stores any data used by the VR content processing and management systems. The data storage 1210 may be used to store real-time data from the IVR system 100, intermediate data generated during the processing of the VR content item 102 for identifying valid objects and inserting hotspots and the finalized IVR content item 140 along with other audio, video content stored and supplied with one or more of the VR content item 102 and ancillary content.

The network interface 1204 connects the computer system 1200 to internal systems for example, via a LAN. Also, the network interface 1204 may connect the computer system 1200 to the Internet. For example, the computer system 1200 may connect to web browsers and other external applications and systems such as the HMD 120 via the network interface 1204.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims, and their equivalents, in which all terms are meant in their broadest reasonable sense unless otherwise indicated.

What is claimed is:

1. An intelligent virtual reality (IVR) system comprising:
   at least one processor; and
   a non-transitory data storage storing machine readable instructions that cause the at least one processor to:
   receive a virtual reality (VR) content item;
      select a subset of video frames from the VR content item for detecting presence of textual and non-textual objects;
      determine from technical metadata of the VR content item, one of a plurality of possible angular values used for a configuration of a camera to generate a N degree video included in the VR content item, wherein N assumes one of the plurality of angular values;
   for each video frame of the subset of video frames:
      dissect the video frame into pixel blocks of preconfigured sizes;
      identify, using trained machine learning (ML) models, at least one of the textual and the non-textual objects within each of the pixel blocks;
      determine, from the at least one textual and non-textual objects, valid objects that are eligible for receiving respective hotspots, the hotspots being configured to provide ancillary content upon selection by a viewer;
      obtain positional coordinates of one or more of the pixel blocks including the valid objects in terms of Cartesian coordinates, the positional coordinates of the pixel blocks convey respective positions of the pixel blocks within a 2D plane of the video frame;

convert the Cartesian coordinates into spherical coordinates that correspond to the positional coordinates of the pixel blocks in the N degree video using a conversion formula based on the camera configuration as provided by the angular value assumed by N;

retrieve the ancillary content associated with each of the valid objects, the ancillary content being retrieved based on rules that specify at least a type of ancillary content to be associated with each of the valid objects;

position the hotspots that enable display of the ancillary content for each of the valid objects based on positional coordinates of the respective pixel blocks containing the valid objects;

transmit an interactive VR content item including the VR content item, the hotspots and the ancillary content for display to a VR device; and enable a head mounted display showing the VR content item for automatically configuring a size of a presentation area for the ancillary content associated with each of the valid objects based on a number of the pixel blocks that include a corresponding object of the valid objects and for positioning the presentation area to correspond to the positional coordinates of the pixel blocks in the N degree video, wherein the positional coordinates are obtained upon the conversion.

2. The IVR system of claim 1, wherein the instructions to select a subset of frames from the VR content item further comprise the instructions that cause the at least one processor to:

extract video frames from the VR content item;
periodically select a video frame; and
include the selected video frame into the subset of video frames.

3. The IVR system of claim 1, wherein the instructions to determine the valid objects further comprise the instructions that cause the at least one processor to:

iteratively process each of the pixel blocks for the determination of the valid objects.

4. The IVR system of claim 1, wherein the instructions to determine the valid objects further comprise the instructions that cause the at least one processor to:

determine at least one of the textual and non-textual objects that have ancillary content items associated therewith.

5. The IVR system of claim 1, wherein the instructions to obtain positional coordinates of the pixel blocks further comprise the instructions that cause the at least one processor to:

determine Cartesian coordinates of the pixel blocks within the video frame.

6. The IVR system of claim 1, wherein the N degree video includes one of a 180 degree video, a 270 degree video and a 360 degree video.

7. The IVR system of claim 1, wherein the VR content item is a pre-recorded content item.

8. The IVR system of claim 1, wherein the VR content item is a live stream of an event.

9. The IVR system of claim 1, further comprising machine readable instructions that cause the at least one processor to:

generate a user interface including an augmentation switch that when switched on enables beginning the determination of the valid objects within the VR content item and augmenting the valid objects with the ancillary content.

10. The IVR system of claim 1, further comprising machine readable instructions that cause the at least one processor to:

configure a display of the hotspots as transparent overlays on the valid objects in the IVR content item.

11. The IVR system of claim 1, further comprising instructions that cause the at least one processor to:

select a type of the ancillary content to be displayed from one of a static image or a video based on the size of the presentation area.

12. A method of providing ancillary content with a virtual reality (VR) content item comprising:

extracting video frames from the VR content item;
generating a subset of the video frames via periodic selection of the video frames;
determining from technical metadata of the VR content item, one of a plurality of possible angular values used for a configuration of a camera to generate a N degree video included in the VR content item, wherein N assumes one of the plurality of angular values;

for each video frame of the subset of video frames:
dissecting the video frame into pixel blocks of preconfigured sizes;
identifying, using trained machine learning (ML) models, at least one of textual and non-textual objects within each of the pixel blocks;
determining, from the at least one textual and non-textual objects, valid objects that are eligible for receiving respective hotspots, the hotspots being configured to provide ancillary content upon selection;
obtaining positional coordinates of one or more of the pixel blocks including the valid objects in terms of Cartesian coordinates, the positional coordinates of the pixel blocks convey respective positions of the pixel blocks within a 2D plane of the video frame;
converting the Cartesian coordinates into spherical coordinates that correspond to the positional coordinates of the pixel blocks in the N degree video using a conversion formula based on the camera configuration as provided by the angular value assumed by N;
retrieving the ancillary content associated with each of the valid objects, the ancillary content being retrieved based on rules that specify at least a type of ancillary content to be associated with each of the valid objects;
positioning one or more of the hotspots for each of the valid objects based on positional coordinates of the respective pixel blocks containing the valid objects;
transmitting an interactive VR content item including the VR content item, the hotspots and the ancillary content for display to a VR device; and
enabling a head mounted display showing the VR content item for automatically configuring a size of a presentation area for the ancillary content associated with each of the valid objects based on a number of the pixel blocks that include a corresponding object of the valid objects and position the presentation area to correspond to the positional coordinates of the pixel blocks in the N degree video, wherein the positional coordinates are obtained upon the conversion.

13. The method of claim 12, wherein obtaining positional coordinates of the pixel blocks further comprises:

determining Cartesian coordinates of the pixel blocks within the video frame.

14. The method of claim 12, further comprising:
obtaining, via the technical metadata associated with the VR content item, information regarding whether the N degree video includes one of a 180 degree video, a 270 degree video and a 360 degree video.

15. The method of claim 12, further comprising:
receiving request from a head mounted display (HMD) device for access to an ecommerce system wherein the ancillary content includes items for sale.

16. The method of claim 15, further comprising:
transmitting the request to the ecommerce system;
enabling purchase of the items via a display of the ancillary content.

17. A head mounted display (HMD) device comprising:
at least one processor; and
a non-transitory data storage storing machine readable instructions that cause the at least one processor to:
receive an interactive virtual reality (VR) content item including VR content comprising valid objects, respective hotspots for the valid objects and ancillary content corresponding to each of the hotspots wherein positional coordinates of the valid objects and the respective hotspots are identified in terms of spherical coordinates obtained from converting Cartesian coordinates of the valid objects using a conversion formula based on a camera configuration as provided by technical metadata of the VR content item, the technical metadata includes information regarding a camera configuration that was used to generate a N degree video included in the VR content item, wherein N assumes one of the plurality of angular values;
display the interactive VR content item such that the hotspots are displayed corresponding to respective ones of the valid objects based on the spherical coordinates that are obtained using the conversion formula based on the angular value of N;
receive a user selection of one of the hotspots respectively displayed with one of the valid objects; and
display ancillary content associated with the user selected hotspot, the ancillary content is sized and shaped corresponding to the valid objects wherein, a size of a presentation area for the ancillary content associated with each of the valid objects is based on a number of the pixel blocks that include a corresponding object of the valid objects and the presentation area is positioned to correspond to the positional coordinates of the pixel blocks in the N degree video, wherein the positional coordinates are obtained upon the conversion.

18. The HMD device of claim 17, wherein the ancillary content includes items for sale and receiving a user selection of the hotspot includes:
receiving a request to purchase one or more of the items for sale; and
enabling purchase of the one or more items for sale from within the IVR content item.

19. The HMD device of claim 18, wherein the non-transitory data storage further comprises instructions that cause the at least one processor to:
configure a size of a presentation area for the ancillary content associated with each of the valid objects based on a number of the pixel blocks that include a corresponding object of the valid objects and the technical metadata of the VR content item.

* * * * *

UNITED STATES PATENT AND TRADEMARK OFFICE
CERTIFICATE OF CORRECTION

PATENT NO.       : 10,854,014 B2
APPLICATION NO.  : 16/028103
DATED            : December 1, 2020
INVENTOR(S)      : Srikanth G. Rao et al.

It is certified that error appears in the above-identified patent and that said Letters Patent is hereby corrected as shown below:

In the Claims

In Column 16, Line 24, Claim 19, should read "The HMD device of claim 17".

Signed and Sealed this
Fourth Day of May, 2021

Drew Hirshfeld
*Performing the Functions and Duties of the
Under Secretary of Commerce for Intellectual Property and
Director of the United States Patent and Trademark Office*